(12) United States Patent
Leung

(10) Patent No.: US 12,241,500 B2
(45) Date of Patent: Mar. 4, 2025

(54) CONNECTOR SYSTEMS AND METHODS THERETO

(71) Applicant: Belgravia Wood Limited, Tortola (VG)

(72) Inventor: Chi Yin Alan Leung, Apleichau (HK)

(73) Assignee: Belgravia Wood Limited, Tortola (VG)

( * ) Notice: Subject to any disclaimer, the term of this patent is extended or adjusted under 35 U.S.C. 154(b) by 95 days.

(21) Appl. No.: 17/776,668

(22) PCT Filed: Nov. 12, 2020

(86) PCT No.: PCT/US2020/060267
§ 371 (c)(1),
(2) Date: May 13, 2022

(87) PCT Pub. No.: WO2021/097113
PCT Pub. Date: May 20, 2021

(65) Prior Publication Data
US 2022/0395126 A1    Dec. 15, 2022

(30) Foreign Application Priority Data

Nov. 14, 2019  (CN) .......................... 201921963618.2
Apr. 27, 2020  (CN) .......................... 202020658115.0

(51) Int. Cl.
*F16B 7/14* (2006.01)
*A47G 33/06* (2006.01)
*H01R 13/60* (2006.01)

(52) U.S. Cl.
CPC .............. *F16B 7/149* (2013.01); *A47G 33/06* (2013.01); *H01R 13/60* (2013.01)

(58) Field of Classification Search
CPC ........ F16B 7/149; F16B 7/0426; A47G 33/06; H01R 13/60; H01R 33/06; Y10T 403/7077
See application file for complete search history.

(56) References Cited

U.S. PATENT DOCUMENTS 3,084,465 A    4/1963  Hellrich
3,131,112 A    4/1964  Abramson
(Continued)

FOREIGN PATENT DOCUMENTS

CN    211269880 U    8/2020
CN    212877779 U    4/2021

OTHER PUBLICATIONS

Extended Search Report dated Oct. 12, 2023 issued in European Patent Application No. 20886312.6.

*Primary Examiner* — Matthew R McMahon
(74) *Attorney, Agent, or Firm* — Troutman Pepper Hamilton Sanders LLP; Christopher C. Close, Jr.; Haden M. Marrs

(57) ABSTRACT

An artificial tree comprising a first trunk section and a second trunk section. The second trunk section can be configured to receive a portion of the first trunk section and can include a sleeve disposed proximate an end of the second trunk section. The sleeve can include a lower lip having an angled portion that can interact with a rolling protrusion disposed on the first trunk section. The rolling protrusion can rotate upon interaction with the angled portion of the lower lip to guide and assist the second trunk section to receive a portion of the first trunk section.

7 Claims, 13 Drawing Sheets

(56) References Cited

U.S. PATENT DOCUMENTS

| | | | |
|---|---|---|---|
| 6,520,192 B1* | 2/2003 | Lo | A45B 19/04 403/109.5 |
| 6,592,094 B1 | 7/2003 | Kao | |
| 6,733,167 B1* | 5/2004 | Kao | G02B 6/0006 362/567 |
| 8,053,042 B1 | 11/2011 | Loomis | |
| 8,186,012 B2* | 5/2012 | Mann | F16B 37/0842 16/427 |
| 8,298,633 B1 | 10/2012 | Chen | |
| 8,579,537 B2* | 11/2013 | VanLandingham | B25G 1/04 16/427 |
| 8,863,416 B2* | 10/2014 | Leung | H01R 13/10 40/442 |
| 9,161,647 B2* | 10/2015 | Leung | A47G 33/12 |
| 9,839,315 B2* | 12/2017 | Leung | A47G 33/06 |
| 9,960,558 B2* | 5/2018 | Ocegueda Gallaga | H01R 33/205 |
| 10,327,576 B2 | 6/2019 | Ocegueda Gallaga et al. | |
| 10,615,555 B1* | 4/2020 | Altamura | H01R 33/06 |
| 2002/0172548 A1* | 11/2002 | Chang | F16B 7/149 403/305 |
| 2013/0108808 A1 | 5/2013 | Leung et al. | |
| 2017/0016466 A1* | 1/2017 | Kim | F16B 7/149 |
| 2017/0256898 A1 | 9/2017 | Ocegueda Gallaga et al. | |

\* cited by examiner

-- Prior Art --

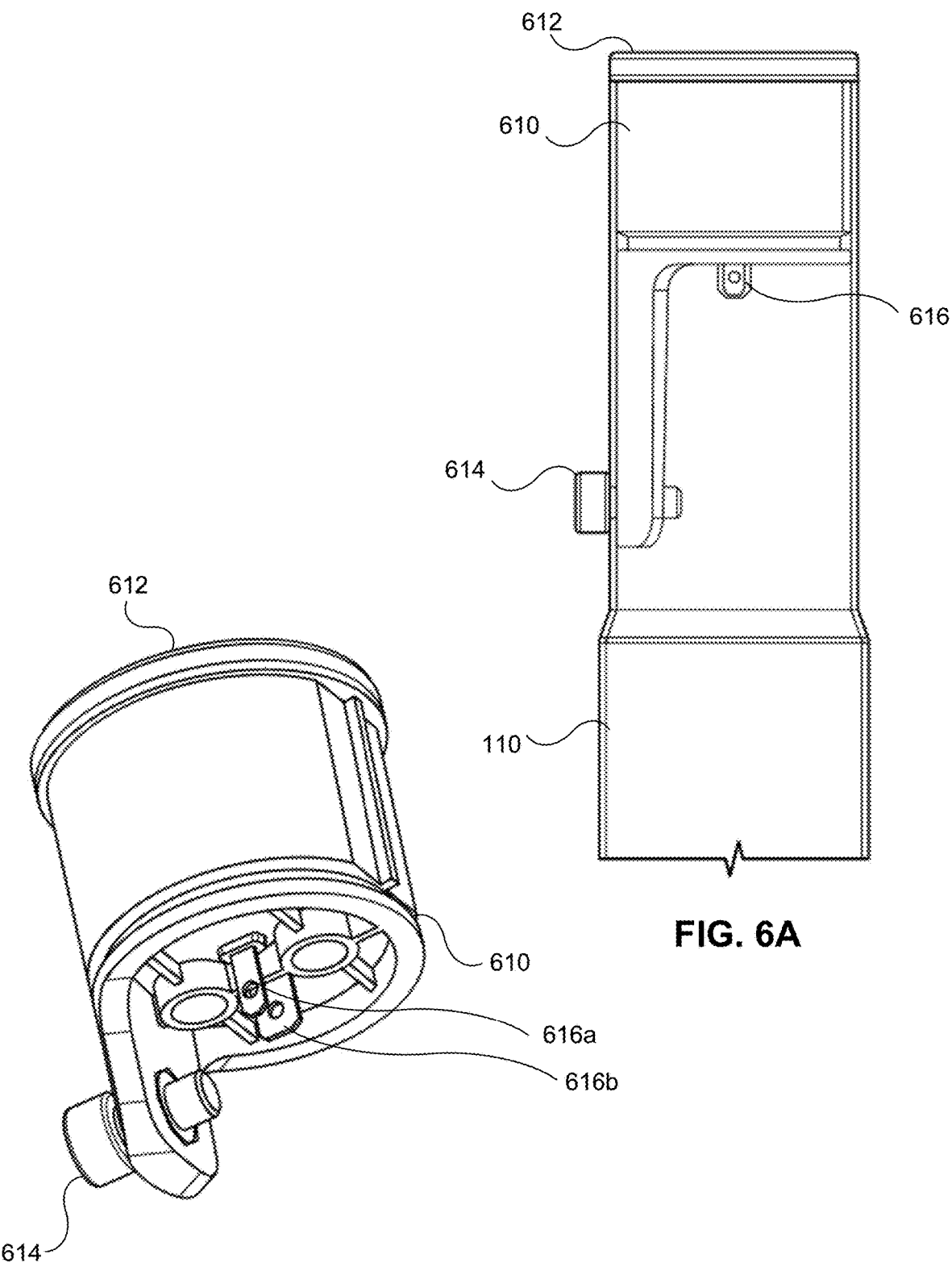

CONNECTOR SYSTEMS AND METHODS THERETO

CROSS-REFERENCE TO RELATED APPLICATIONS

This application is a national stage application, filed under 35 U.S.C. § 371, of International Patent Application No. PCT/US20/60267, filed on 12 Nov. 2020, which claims benefit under 35 U.S.C. § 119(a), of Chinese Utility Model Patent No. 201921963618.2, filed Nov. 14, 2019, and Chinese Patent App. No. 202020658115.0, filed Apr. 27, 2020, the entire contents and substance of each are incorporated herein by reference in their entirety.

FIELD OF THE INVENTION

The presently disclosed subject matter relates generally to connectors for components of artificial trees and stabilizers thereof.

BACKGROUND

Those celebrating Christmas or other holidays traditionally bring a natural evergreen tree indoors to decorate the tree with ornaments, lights, garland, tinsel, and the like. Natural trees, however, can be quite expensive and are recognized by some as a waste of environmental resources. In addition, natural trees can be cumbersome, requiring water to prevent the tree from drying out, and messy, leaving behind sap and/or needles after removal. Further, if the tree is not adequately watered, it can become so dried out that it becomes a fire hazard. Each holiday season, a new tree must be obtained and decorated, and at the termination of the holiday season, the decorations must be removed. By that time, the needles have typically dried and may be quite sharp such that removal of the decorations can be a painful process. Also, the natural tree is often disposed in landfills, further polluting these overflowing settings.

To overcome the disadvantages of a natural tree yet still celebrate with a Christmas tree, a great variety of artificial trees are available. For the most part, these artificial trees must be assembled for use and disassembled after use. Artificial trees have the advantage of being usable over a period of years and thereby eliminate the annual expense of purchasing live trees for the short holiday season. Further, they help reduce the chopping down of trees for a temporary decoration, and the subsequent disposal, typically in a landfill, of same.

Generally, most artificial Christmas trees comprise a multiplicity of separate branches each formed of a plurality of plastic needles held together by twisting a pair of wires about them. In other instances, the branches are formed by twisting a pair of wires about an elongated sheet of plastic material having a large multiplicity of transverse slits. In still other artificial Christmas trees, the branches are formed by injection molding of plastic.

Irrespective of the form of branch, the most common form of artificial Christmas tree comprises a plurality of trunk sections connectable to one another to form a trunk. For example, the first and second trunk sections each comprise an elongate body. Near a first end of the first trunk section, the body of the first trunk section tapers slightly to reduce the diameter of the body. The second end of the second trunk section includes a receiving portion (e.g., a female end), and the tapered first end acts as an extending portion (e.g., a male end). Typically, the trunk has a generally cylindrical shape. In other words, the diameter of the second end (i.e., the receiving portion) is larger than the diameter of the tapered first end (the extending portion). To connect the trunk sections, the first end inserts into the second end. For example, the extending portion of the first trunk section is inserted into the non-extending portion of the second trunk section.

Trunk designs implementing extending portions extended into a receiving end remain imperfect. Due to the difference in diameters of the tapered and receiving ends, the extending portion up to a certain point can slide into the receiving end to form a continuous trunk. Due to the difference between the outer diameter of the received portion of the extending portion and the inner diameter of the receiving end, however, the first trunk section is permitted to shift and pivot with respect to the second trunk section. For example, the extending portion is permitted to pivot around the top of the receiving end, where the extending portion's diameter increases to no longer allow for reception past that point. This free play movement around the pivot point can lead to uneven loading, as the extending portion pivots slightly to one side opposed to resting evenly around the receiving end. The uneven loading over time can lead to the trunk bending and potentially breaking over time.

SUMMARY

The above and other concerns are addressed by the presently disclosed subject matter. Briefly described, the presently disclosed subject matter relates to a connector system for connecting a first trunk section to a second trunk section. The connector system can comprise a sleeve. The sleeve can have a substantially cylindrical inner shape or any inner shape corresponding to the external shape of an artificial tree trunk system. The sleeve can have a first end and a second end. The first end can include a lower lip that can be angled downward. The interior of the sleeve can include two adjacent portions. The first portion can have an interior wall that includes axially extending ribs. The axially extending ribs can provide a slip fit between the sleeve and the first trunk section upon insertion of the first trunk section into the first portion of the sleeve. The second portion can have an interior wall that includes circumferentially extending ribs. The circumferentially extending ribs can provide a press fit between the sleeve and the second tree trunk upon insertion of the second trunk section into the sleeve. When assembled, the sleeve can provide reinforcement to the connection of the first and second tree sections, while also reducing or eliminating movement or pivoting between the two trunk sections.

In one exemplary and non-limiting embodiment, the presently disclosed subject matter is a kit for constructing an artificial tree trunk. The kit has a first tree trunk having a first diameter, the first tree trunk narrowing to form an extending end with a second diameter, and a second tree trunk having a receiving end with a diameter configured to receive the extending end. The kit can have more than two sections, i.e. the first trunk section and the second trunk section. The number of trunk sections is merely for purposes of describing an aspect of the presently disclosed subject matter and is not intended to be limiting. The kit further has a generally hollow sleeve having a first sleeve end with a first internal diameter approximately equal to the first trunk section and a lower lip having an angled portion. The sleeve also has a second sleeve end having a second internal diameter approximately equal to the second trunk section. The sleeve further has an internal narrowed region that narrows from a first internal diameter approximately equal to the first trunk section to a second internal diameter approximately equal to the extending portion of the first trunk section. The kit further has a rolling protrusion extending through a wall of the first trunk section. The rolling protrusion can interact with the lower lip at a plurality of points along the angled portion during artificial tree assembly.

Another exemplary and non-limiting embodiment of the presently disclosed subject matter is a method for assembling a tree trunk of an artificial tree. A receiving end of a second trunk section is inserted into a second end of the sleeve. An extending end of a first trunk section is inserted into a first end of a sleeve. The angled portion of the lower lip of the first end of the sleeve and the rolling protrusion facilitate interlocking of the first trunk section and the second trunk section. In this example, an inner diameter of the first end is approximately equal to the extending end of the first trunk section and an inner diameter of the second end is approximately equal to the receiving end of the second trunk section.

The foregoing summarizes only a few aspects of the presently disclosed subject matter and is not intended to be reflective of the full scope of the presently disclosed subject matter as claimed. Additional features and advantages of the presently disclosed subject matter are set forth in the following description, may be apparent from the description, or may be learned by practicing the presently disclosed subject matter. Moreover, both the foregoing summary and following detailed description are exemplary and explanatory and are intended to provide further explanation of the presently disclosed subject matter as claimed.

BRIEF DESCRIPTION OF THE DRAWINGS

The accompanying drawings, which are incorporated in and constitute a part of this specification, illustrate multiple embodiments of the presently disclosed subject matter and, together with the description, serve to explain the principles of the presently disclosed subject matter; and, furthermore, are not intended in any manner to limit the scope of the presently disclosed subject matter.

FIG. 6A is a cross-sectional view of a trunk section with a sleeve installed and FIG. 6B is a bottom perspective view of a sleeve, in accordance with the presently disclosed subject matter.

DETAILED DESCRIPTION

Figure 1:
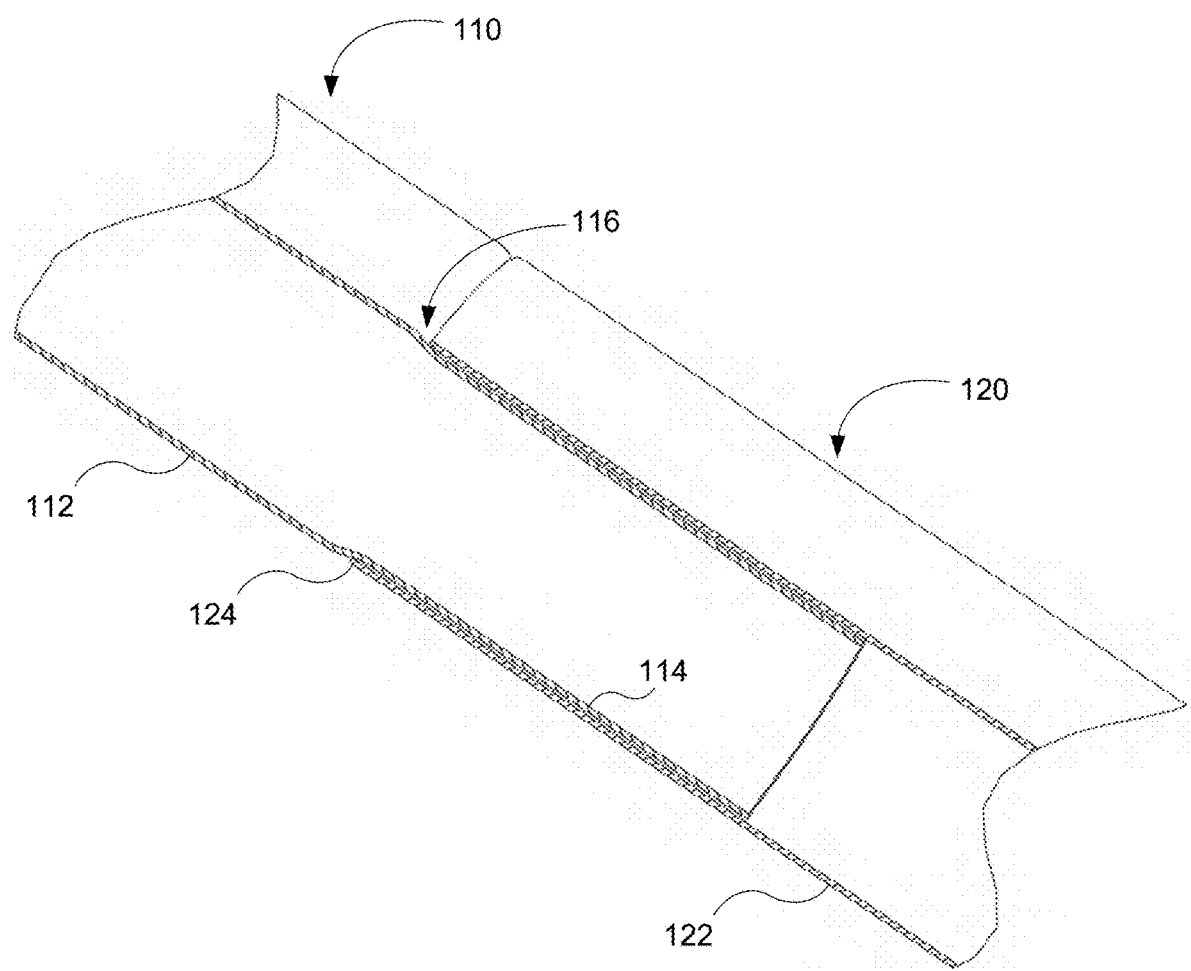
FIG. 1 is a partial cross-sectional view of a prior art artificial tree system with a first trunk section inserted into a section trunk section.

The various embodiments of the presently disclosed subject matter are described with specificity to meet statutory requirements. However, the description itself is not intended to limit the scope of this patent. Rather, it has been contemplated that the claimed subject matter might also be embodied in other ways, to include different steps or elements similar to the ones described in this document, in conjunction with other present or future technologies.

It should also be noted that, as used in the specification and the appended claims, the singular forms "a," "an" and "the" include plural references unless the context clearly dictates otherwise. References to a composition containing "a" constituent is intended to include other constituents in addition to the one named. Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Ranges and/or sizes may be expressed herein as from "about" or "approximately" one particular value and/or to "about" or "approximately" another particular value. When such a range or size is expressed, other exemplary embodiments include from the one particular value and/or to the other particular value. Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" may be used herein to connote different aspects of methods employed, the term should not be interpreted as implying any particular order among or between various steps herein disclosed unless and except when the order of individual steps is explicitly required.

To facilitate an understanding of the principles and features of the invention, various illustrative embodiments are explained below. In particular, the presently disclosed subject matter is described in the context of being a connector system for assembling an artificial tree. Embodiments of the presently disclosed subject matter, however, are not limited to use in artificial tree. Rather, embodiments of the invention can be used for assembling other objects, such as poles.

Referring now to the figures, wherein like reference numerals represent like parts throughout the views, the connector system will be described in detail.

Typically, a conventional artificial tree includes a plurality of tree trunks that are connectable to one another. FIG. 1 illustrates a partial cross-sectional view of a conventional artificial tree system including a hollow first trunk section 110 connected to a hollow second trunk section 120. For clarity, the first and second trunk sections are displayed without branches, but branches can extend radially outward from the trunk sections. The first trunk section 110 can include an elongate body 112 and an extending portion 114. The second trunk section 120 can include an elongate body 122 and a receiving portion 124. The extending portion 114 of the first trunk section 110 can be configured to at least partially insert into the receiving portion 124 of the second trunk section 120. Stated conversely, the receiving portion 124 can be configured to at least partially receive the extending portion 114. The trunk sections 110, 120 can comprise metal (e.g., steel), plastic, or any other useful material.

The elongate bodies 112, 122 can have a cross-sectional shape that is circular, ovular, triangular, rectangular, square, or any other desired shape. As will be appreciated, trunk sections having a cylindrical shape (i.e., a circular cross-sectional shape) can be most commonly desired because the cylindrical shape is most similar to a natural tree trunk shape. The extending portion 114 can be capped or open-ended. The first trunk section 110 can have a first outer diameter at the body 112 and a second outer diameter at the extending portion 114. The outer diameter of the extending portion 114 (i.e., second outer diameter) can be smaller than the outer diameter of the body portion 112 (i.e., first outer diameter). The outer diameter of the first trunk section can transition between the first and second outer diameters at a tapered region 116, which can separate the elongate body 112 from the extending portion 114.

The elongate body 122 of the second trunk section 120 can have an outer diameter approximately equal to the outer diameter of the elongate body 112 (i.e., first outer diameter) of the first trunk section 110. The receiving portion 124 of the second trunk section 120 can have an inner diameter that is larger than the outer diameter of the extending portion 114 (i.e., second outer diameter) of the first trunk section 110, such that the receiving portion 114 can at least partially receive the extending portion 114 of the first trunk section 110. For example, the receiving portion 124 can be configured to receive an end of the first trunk section 110 (i.e., the extending portion 114) until the tapered region 116 of the first trunk section 110 has an outer diameter that is approximately equal to the inner diameter of the receiving portion 124 of the second trunk section 120, such that at least a portion of the tapered region 116 can abut the end of the second trunk section 120.

A difference between the inner diameter of the receiving portion 124 and the second outer diameter of the extending portion 114 (e.g., due to variations during manufacturing) can cause a gap (not shown) to result between the outer surface of the extending portion 114 of the first trunk section 110 and the inner surface of the receiving portion 124 of the second trunk section 120. The gap can permit free play of the extending portion 112 within the receiving portion 124 of the second trunk section 120, which can lead to the first trunk section 110 pivoting at the tapered region 116 with respect to the second trunk section 120. Over time, the resulting uneven loading caused by the pivoting can cause the first trunk section 110 and/or second trunk section 120 to become bent, crooked, and/or otherwise deformed.

Figure 2:
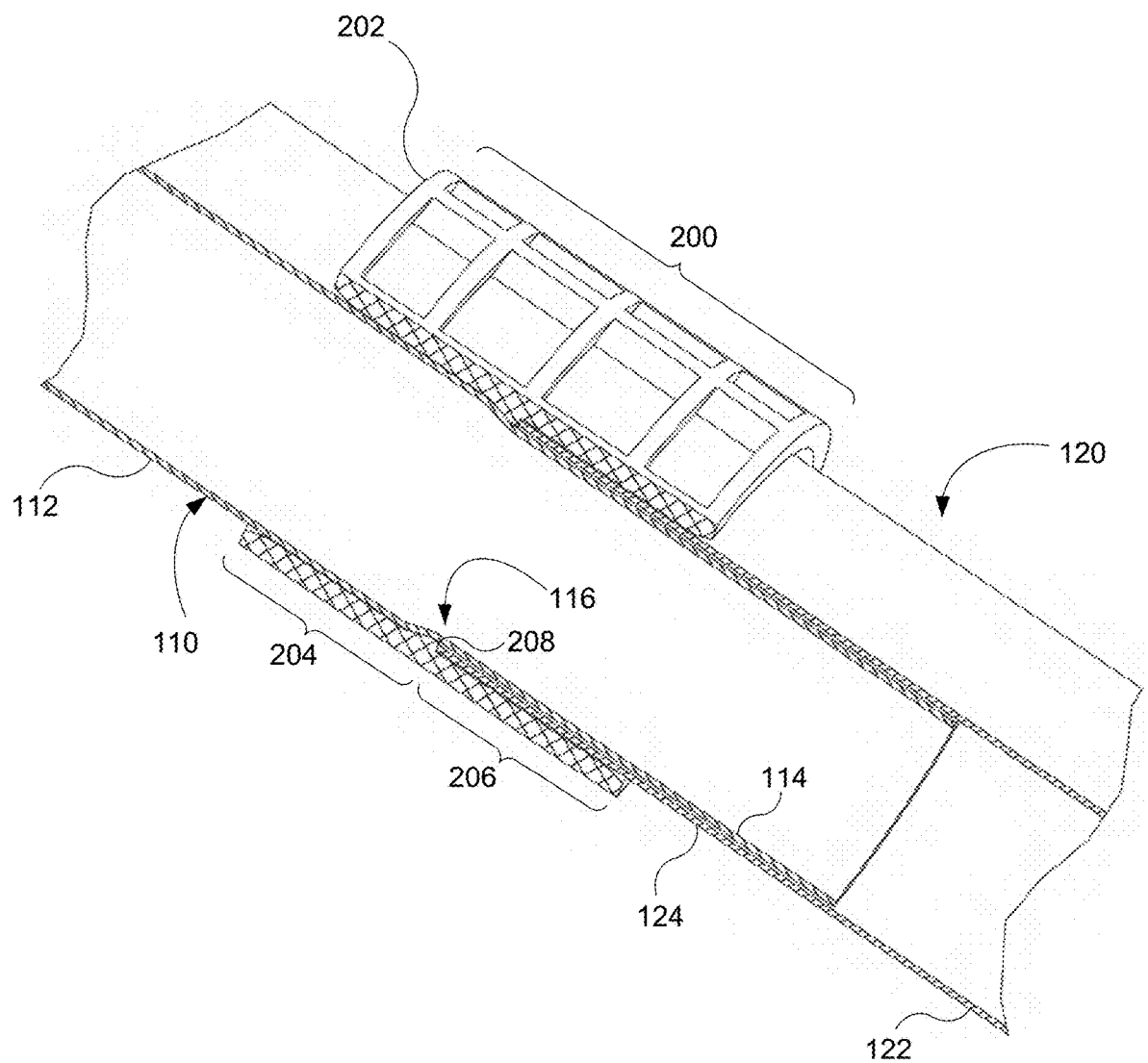
FIG. 2 is a partial cross-sectional view of an example artificial tree system including a sleeve, in accordance with the presently disclosed subject matter.

As shown in FIG. 2, the presently disclosed technology includes a connector system 200, and the connector system 200 can include a sleeve 202. As described more fully below, the connector system 200 can provide reinforcement to the connection of the first and second trunk sections 110, 120, while also reducing or eliminating movement or pivoting between the two trunk sections 110, 120. Thus, the connector system 200 can help prevent uneven loading and/or eventual damage to the trunk sections 110, 120.

In addition, the sleeve 202 can be useful to protect the end of a trunk section 110, 120 during transportation or storage. For example, during shipping, a trunk section 110, 120 can be subjected to forces that compress the end of one or more of the trunk sections 110, 120. By providing the sleeve 202 on the end of the trunk section 110, 120, the sleeve 202 can protect the end of the trunk section 110, 120 on which the sleeve 202 is installed. The sleeve 202 can be constructed of material that is stronger or than the trunk section 110, 120 and/or can have a geometry more resistant to compressive forces than the trunk section 110, 120.

Referring to FIG. 2, the sleeve 202 can have an internal shape that substantially corresponds to the outer shape of the first and second trunk sections 110, 120. For example, the sleeve 202 can have an internal shape that is substantially cylindrical. The sleeve 202 can have an external shape that is the same as its internal shape. For example, the sleeve 202 can have a substantially cylindrical internal shape and a substantially cylindrical external shape. Alternatively, the sleeve 202 can have an outer shape that is different from its internal shape. For example, the sleeve 202 can have an outer shape that is blocked (i.e., squared or rectangular prism) or asymmetrical. The outer surface of the sleeve 202 can be smooth and/or solid. Alternatively, the outer surface of the sleeve 202 can have ribs or channels, a lattice structure, or some other structure in which the outer surface of the sleeve 202 has reduced material. Thus, the sleeve 202 can have the same or substantially the same strength, rigidity, and/or structural characteristics as a solid sleeve while using less material than a solid sleeve, which can reduce manufacturing costs.

The sleeve 202 can facilitate a secure mechanical connection between the first trunk section 110 and the second trunk section 120 by providing additional stability at the connection point of the first and second trunk section 110, 120. The sleeve 202 can encompass and/or overlap a portion of the elongate body 112 of the first trunk section 110 (i.e., proximate the tapered region 116), the tapered region 116 of the first trunk section, and a portion of the elongate body 122 of the second trunk section 120 (i.e., proximate the receiving portion 124). The sleeve 202 can have multiple portions. For example, the sleeve 202 can have a first portion 204, a second portion 206, and an inner protrusion 208. The first portion 204 of the sleeve 202 can have an inner diameter that is slightly larger than the outer diameter of the body 112 of the first trunk section 110 (i.e., the first outer diameter of the first trunk section 110). The second portion 206 of the sleeve 202 can have an inner diameter that is slightly larger than the outer diameter of the elongate body 122 of the second trunk section 120. The first portion and 204 and second portion 206 of the sleeve 202 can have the same inner diameter, or they can have different inner diameters.

The inner protrusion 208 can define a variable inner diameter of the sleeve 202. As non-limiting examples, the inner protrusion 208 can taper on one or both sides. The inner protrusion 208 can correspond to the tapered region 116 of the first trunk section 110. For example, the inner protrusion can mirror the taper of the tapered region 116. Accordingly, the inner protrusion 208 can abut a portion of the tapered region 116. The inner protrusion 208 can be configured to also abut a portion of the receiving portion 124 of the second trunk section 120 (e.g., the edge of the receiving portion 124). Stated otherwise, the inner protrusion 208 can be configured to effectively "plug" any pivot area between the tapered region 116 of the first trunk section 110 and the edge of the receiving portion 124 of the second trunk section 120.

As described herein, the dimensions of the various portions of the sleeve 202 can provide a tight fit with respect to the corresponding portions of the first and second trunk sections 110, 120 such that the sleeve 202 can limit any free play and/or pivoting between the first and second trunk sections 110, 120 about the tapered region 116. Accordingly, the connector system 200 can provide a more balanced load across the artificial tree trunk and can decrease any chance of the artificial tree becoming damaged and/or crooked.

Figure 3:
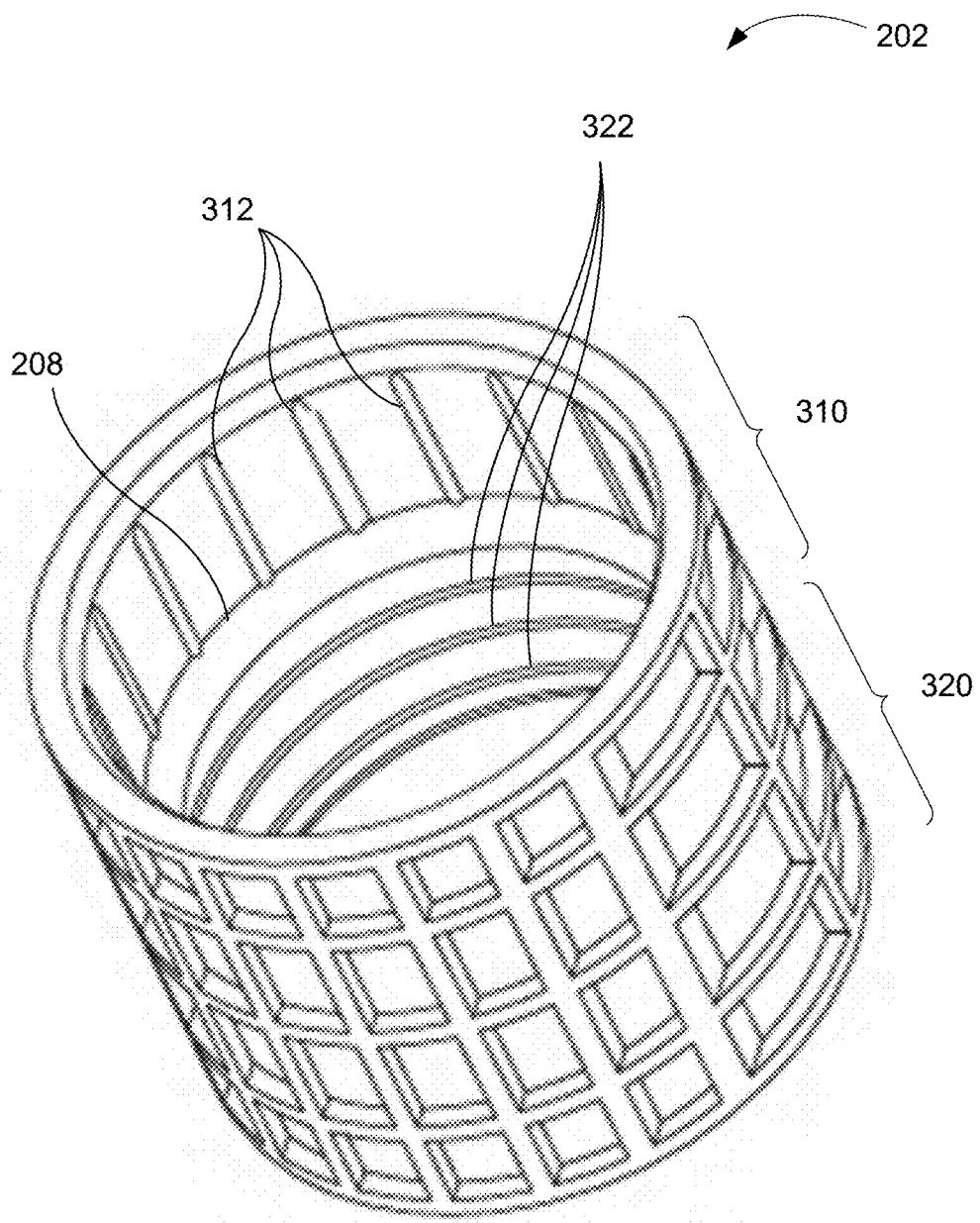
FIG. 3 is a top perspective view of a sleeve, in accordance with the presently disclosed subject matter.
Figure 4:
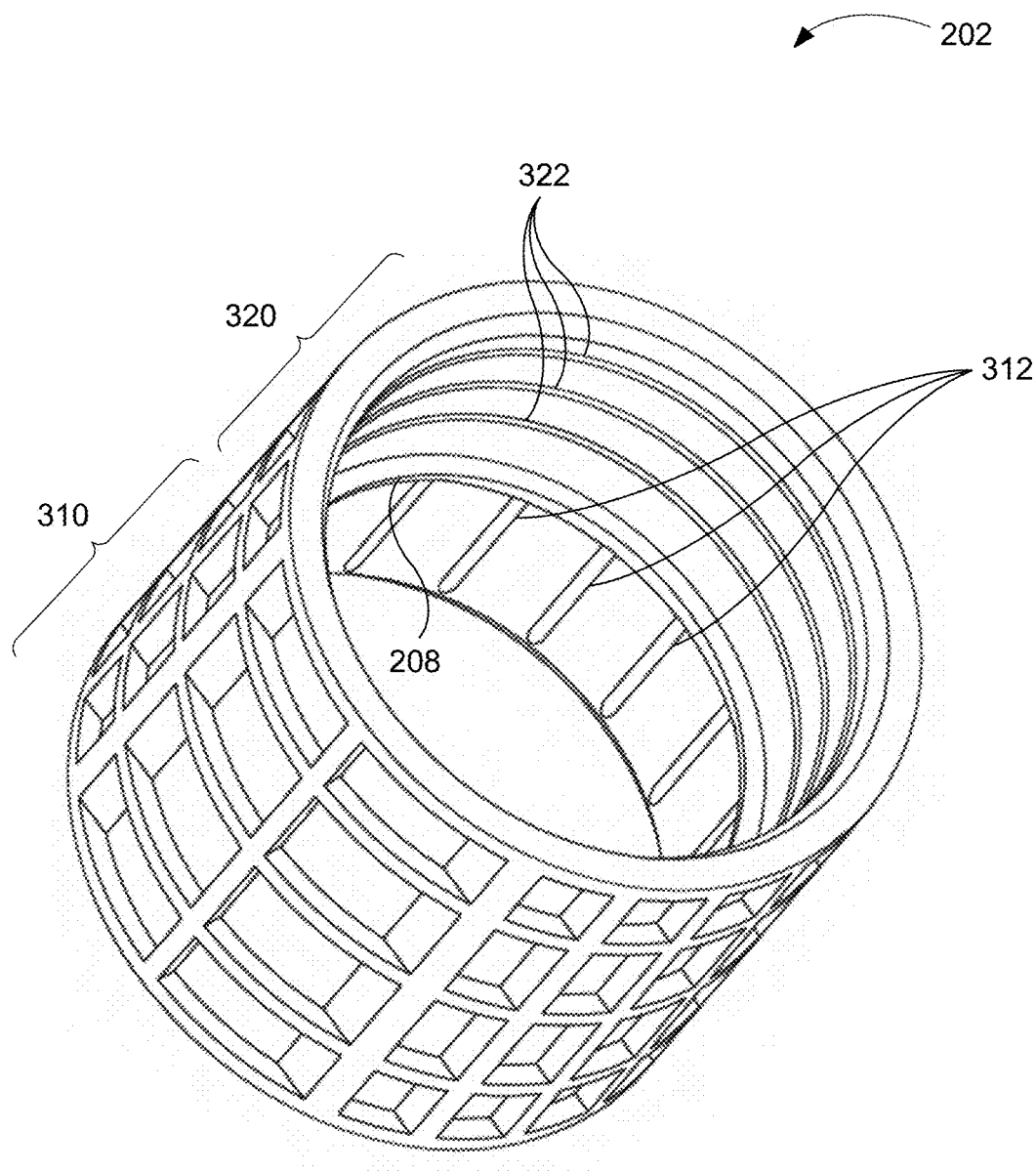
FIG. 4 is a bottom perspective view of a sleeve, in accordance with the presently disclosed subject matter.

The sleeve 202 can include ribs to help facilitate a desired fit with the first trunk section 110 and/or the second trunk section 120. The sleeve 202 can include a first plurality of ribs and a second plurality of ribs, and the first plurality of ribs can be oriented on the sleeve 202 differently as compared to the second plurality of ribs. For example, referring to FIGS. 3-5, the sleeve 202 can include a first end 310 including a first plurality of ribs 312 and a second end 320 including a second plurality of ribs 322. The first plurality of ribs 312 can protrude inwardly from an interior wall of the sleeve 202 and can be substantially axially aligned (i.e., substantially parallel to a central axis of the sleeve 202). Each rib of the first plurality of ribs 312 can be substantially parallel. The axial direction of the first plurality of ribs 312 can permit a predetermined amount of slippage with respect to the body 112 or some other portion of the first trunk section. To permit increased slippage, the number of ribs can be reduced and/or the protruding distance of some or all of the ribs can be reduced. Conversely, to increase slippage, the number of ribs can be increased, the protruding distance of some or all of the ribs can be increased, and/or the angle of some or all of the ribs can increase with respect to the central axis of the sleeve 202. Slippage between the first end 310 and the first trunk section 110 can permit the first trunk section 110 to be readily inserted and removed from the sleeve 202, while still providing a fit tight enough to prevent pivoting or jostling of the first trunk section 110 relative the second trunk section 120.

The second plurality of ribs 322 can protrude inwardly from an interior wall of the sleeve 202 (e.g., at the second end 320) and can be substantially annular (i.e., disposed about the circumference of the interior wall of the sleeve). Each rib of the second plurality of ribs 322 can be substantially parallel. Each rib of the second plurality of ribs 322 can extend about the central axis of the sleeve 202. Stated otherwise, each rib of the second plurality of ribs 322 can lie on a plane that is substantially perpendicular to the axis of the sleeve 202. The annular orientation of the second plurality of ribs 322 can facilitate a semi-permanent attachment between the sleeve 202 and the second trunk section. As one of skill in the art will appreciate, a "semi-permanent fit" may also be called a "tight fit" and can refer to a type of interference fit in which one component can be assembled into another component via hand pressure and/or with a hand hammer; the two components will remain connected unless a substantial pulling force separates them. To reduce the tightness or permanence of fit, the annular rings can be angled such that the ribs are no longer substantially perpendicular to the axis of the sleeve 202. To increase the tightness or permanence of the fit, the protruding distance of the second plurality of ribs 322 can be increased and/or the internal diameter of the second end 320 of the sleeve 202 can be decreased to more closely match the outer diameter of the extending portion 114 of the first trunk section 110. For example, the second plurality of ribs 322 and/or the internal diameter of the second end 320 of the sleeve 202 can be dimensioned such that a minimum internal diameter of the second end 320 is slightly smaller than an outer diameter of the second trunk section 120. As a non-limiting example, when the second trunk section 120 is inserted into the second end 320, a press fit can be formed.

Alternatively or in addition, the first plurality of ribs 312 and/or the second plurality of ribs 322 can be arranged in a spiral or thread-like formation such that the corresponding first or second trunk section 110, 120 can be inserted and/or removed via a screwing action. Alternatively or in addition, a glue, epoxy, or other adhesive can be applied between the interior surface of the second end 320 and/or the exterior surface the second trunk section 120. Alternatively or in addition, a mechanical fastening member (e.g., a screw, a bolt) can attach an end of the sleeve 202 to the second trunk section 120. One or some of these and other attachment methods can be used to vary the permanence of attachment between the sleeve 202 and the second trunk section 120, as desired.

Although the sleeve 202 is described herein as having a more permanent attachment to that the second trunk section 120 than the first trunk section 110, the inverse can be true. That is, the sleeve 202 can be configured to attach to the first trunk section 110 more permanently that the sleeve 202 can attach to the second trunk section 120.

Alternatively or in addition, either end of the sleeve (i.e., first end 310 or second end 320) can be configured to connect or attach to either end of a trunk section (i.e., male end or female end). That is, both the first end 310 and the second end 320 of the sleeve can be attachable to either the body 112 of the first trunk section 110 or the elongate body 122 of the second trunk section 120.

Figure 5:
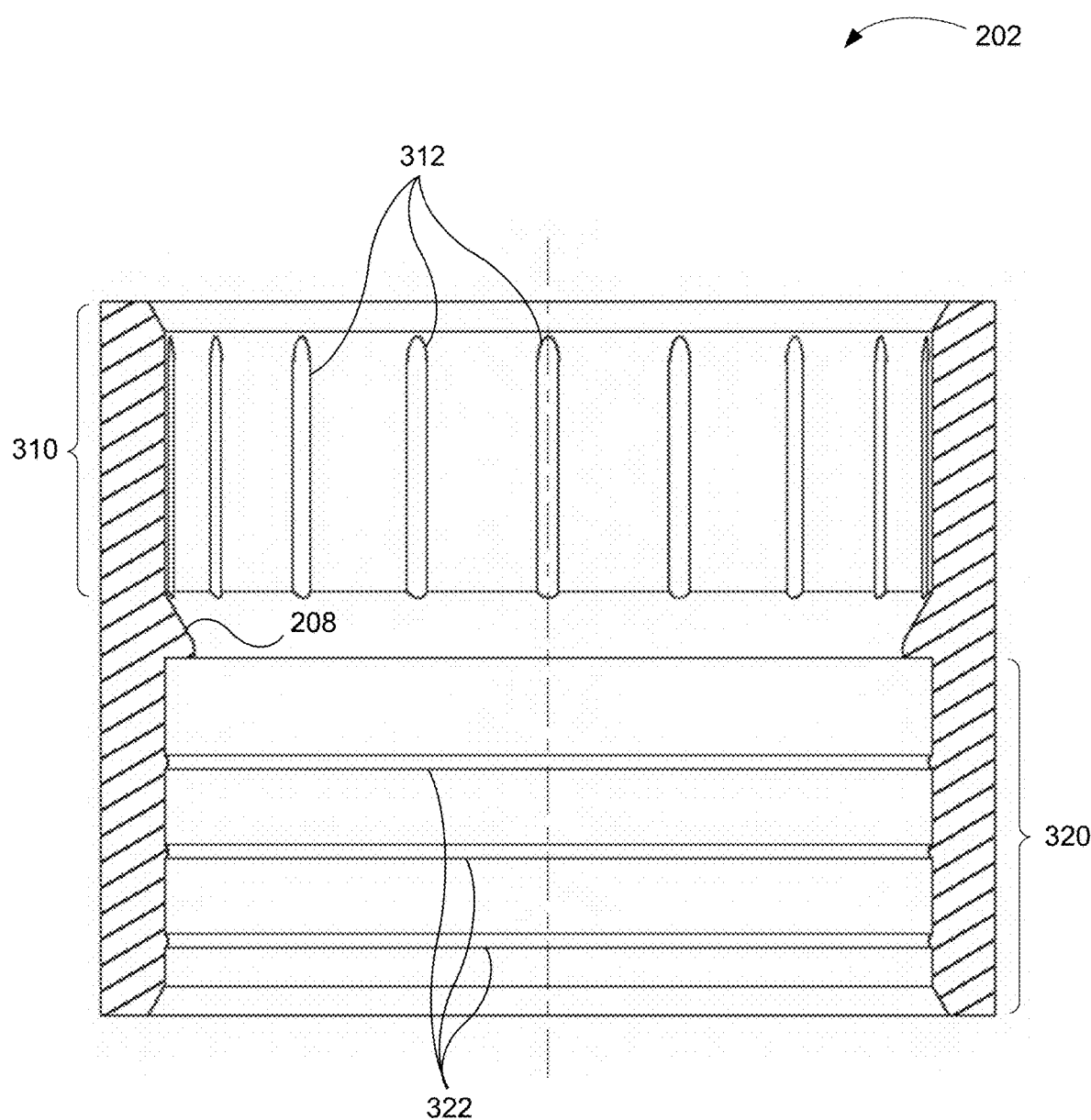
FIG. 5 is a cross-sectional view of a sleeve, in accordance with the presently disclosed subject matter.

As described above, the inner protrusion 208 can taper on one or both sides. Referring in particular to FIG. 5, the inner protrusion 208 can taper on one side and can have a substantially flat step on the opposite side. The tapered side of the inner protrusion 208 can be configured to mirror the tapered region 116 of the first trunk section 110, and the slat step of the inner protrusion 208 can be configured to abut the edge of the receiving portion 124 of the second trunk section 120. Such a design may provide the most effective "plug" of the pivot area between the tapered region 116 of the first trunk section 110 and the edge of the receiving portion 124 of the second trunk section 120.

Referring to FIGS. 6A-8, the connector system 200 can be a multi-piece sleeve system. For example, the connector system 200 can include a male sleeve 610 and a female sleeve 720. The male sleeve 610 can have an outer diameter that is approximately equal to the internal diameter of the extending portion 114 of the first trunk section 110. The male sleeve 610 can have a lip 612 configured to abut and/or overlap the edge of the extending portion. The lip 612 can have an outer diameter that is approximately equal to the outer diameter of the extending portion 114. The male sleeve 610 can include an anti-rotation member 614. The anti-rotation member 614 can be a screw or a bolt. The anti-rotation member 614 can extend through a wall of the first trunk section 110. The anti-rotation member 614 can extend through both the wall of the first trunk section 110 and a portion of the male sleeve 610 that extends into an internal portion of the first trunk section 110.

The female sleeve 720 can have an internal diameter that is approximately equal to the outer diameter of the receiving portion 124 of the second trunk section 120. The female sleeve 720 can including an overlapping portion 722 that abuts the outer surface of the receiving portion 124 and an extending portion 724 that extends axially beyond the edge of the receiving portion 124. The overlapping portion 722 can have annular ribs (e.g., similar to the ribs 322 of the second end 320 of the sleeve 202). Alternatively or in addition, the ribs of the overlapping portion 722 can be arranged in a spiral or thread-like formation such that the second trunk section 120 can be inserted and/or removed via a screwing action. Alternatively or in addition, a glue, epoxy, or other adhesive can be applied to or between the interior surface of the overlapping portion 722 and/or the exterior surface the second trunk section 120. Alternatively or in addition, a mechanical fastening member (e.g., a screw, a bolt) can attach the overlapping portion 722 to the second trunk section 120. One or some of these and other attachment methods can be used to vary the permanence of attachment between the female sleeve 720 and the second trunk section 120, as desired.

The extending portion 724 of the female sleeve 720 can have axially extending ribs (e.g., similar to the ribs 312 of the first end 310 of the sleeve 202). This can provide a slip fit between the extending portion 724 and the first trunk section 110.

The female sleeve 720 can include a recess 726. The recess 726 can be configured to receive an extending portion of the anti-rotation member 614. Thus, mating the male sleeve 710 with the female sleeve 720 can restrict rotation of the first trunk section 110 relative the second trunk section 120 and vice versa. This can be useful in many scenarios. For example, some artificial trees include internal wiring and the ends of the corresponding trunk sections include electrical contacts. The anti-rotation member 614 of the male sleeve 610 and the recess 726 of the female sleeve 720 can be useful as an alignment mechanism to align the electrical contacts of the trunk sections 110, 120. Further, the anti-rotation member 614 and the recess 726 can prevent subsequent rotation or twisting, which could otherwise damage the electrical contacts.

Figures 7A, 7B:
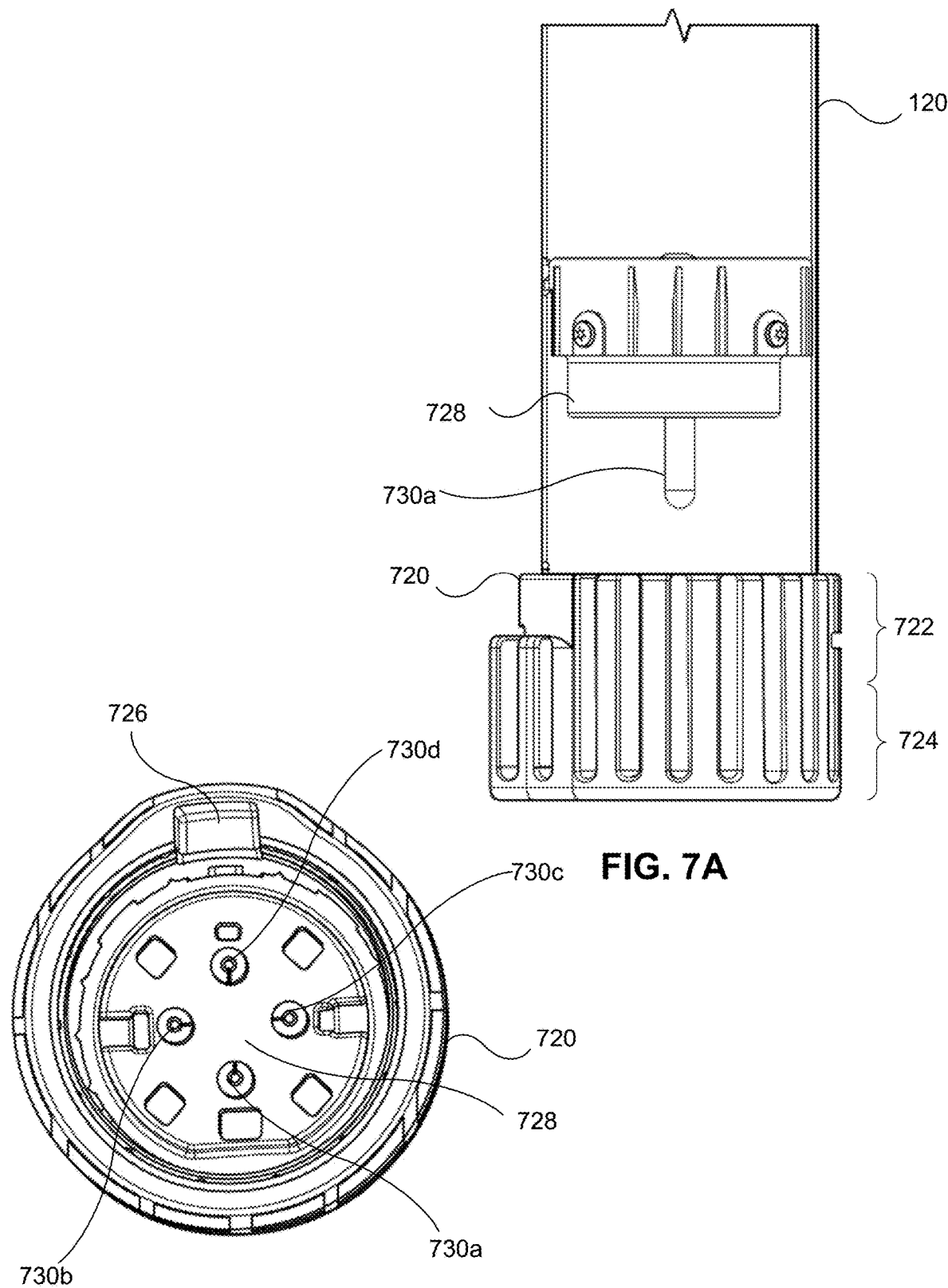
FIG. 7A is a cross-sectional view of a trunk section with a sleeve installed and FIG. 7B is a top view of a sleeve, in accordance with the presently disclosed subject matter.
Figure 8:
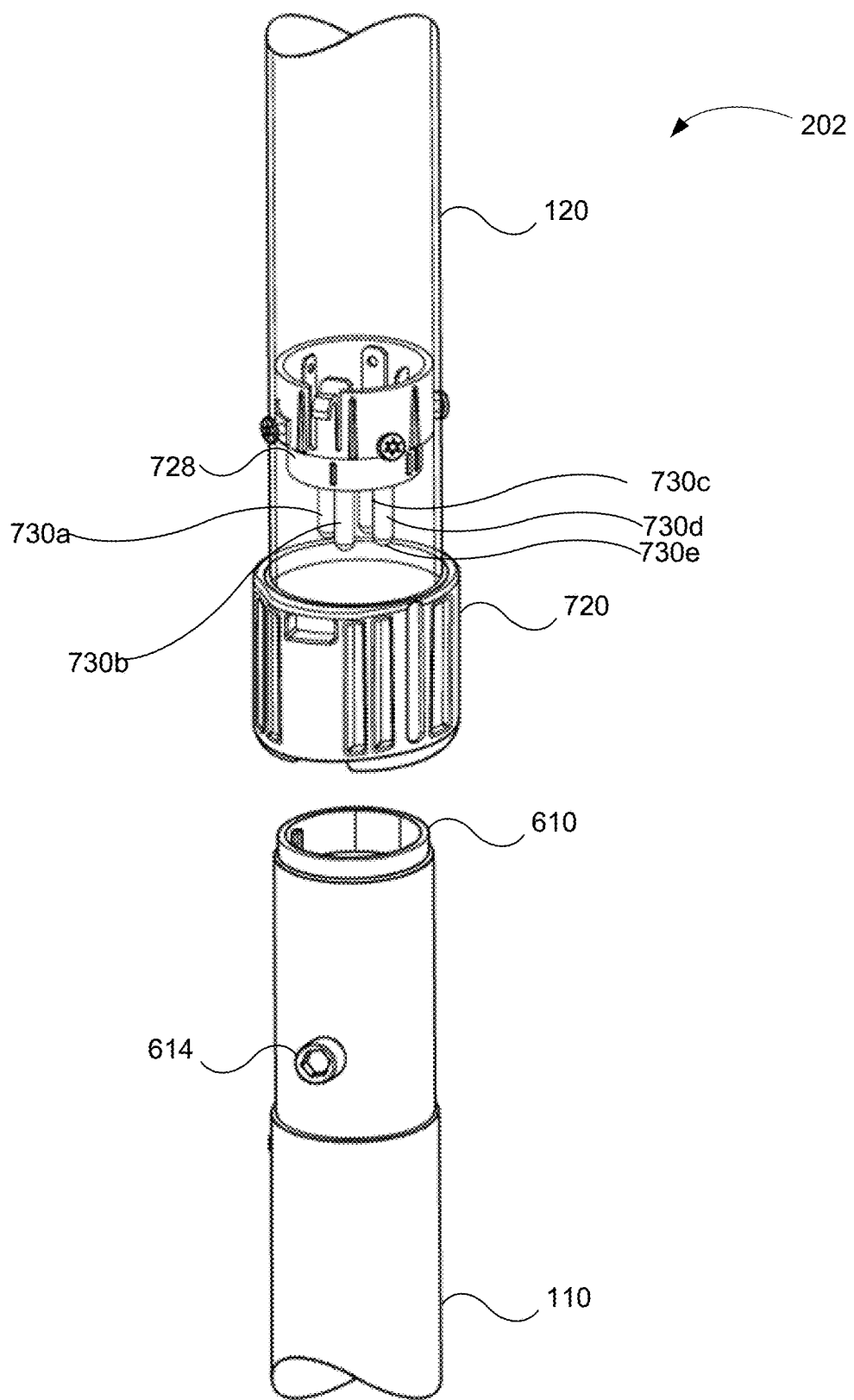
FIG. 8 is a perspective view of an assembly, in accordance with the presently disclosed subject matter.

To illustrate the inclusion of such internal wiring and electrical contacts, FIGS. 6A, 7A, and 8 show the first and/or second trunk section 110, 120 as transparent to illustrate internal electrical contacts.

As depicted in FIG. 6A, trunk section 110 can include a male sleeve 610 having a lip 612, anti-rotation member 614, and power system distribution connector(s) 616a, 616b. As further depicted, male sleeve 610 can be inserted into an end of the trunk section 110 such that the lip 612 abuts the outer diameter of the end of the trunk section 110. FIG. 6B depicts a perspective view of assembled male portion 610.

Male sleeve 610 can be retained by the first trunk section 110 by frictional forces between the inner wall of the first trunk section 110 and an outer wall of the male sleeve 610. Alternately or in addition, the inner wall of the male sleeve 610 and the inner wall of the first trunk section 110 can be threaded such that the male sleeve 610 can be screwed into the first trunk section 110, or the male sleeve 610 can be attached to the first trunk section 110 by crimping, welding, or soldering or with an adhesive (e.g., glue, epoxy), a screw, a bolt, one or more rivets, a retaining clip, a detent and notch assembly (e.g., a protrusion extending from either the male sleeve 610 or the first trunk section 110 and the remaining object including a notch, a hole, a depression, a lip, or any other feature configured to retain the protrusion), or any other known attachment mechanisms or methods. Further, as the anti-rotation member 614 can be attached to the male sleeve 610 through a hole in the trunk section 110. As will be appreciated, such a connection provides additional mechanical support between the male sleeve 610 and the trunk section 110.

The male sleeve 610 can include a top surface configured to abut a bottom surface of an internal electrical connector 728 of the second trunk section 120 when the first trunk section 110 and the second trunk section 120 are connected. The top surface can extend to, and be flush with, an end of the second trunk section 110. Alternately, the top surface can extend beyond the end of the second trunk section 120, or the end of the second trunk section 120 can extend beyond the top surface. Further, and as previously described, male sleeve 610 can include a lip 612 such that the top surface extends beyond the end of the trunk section 120 and the lip 612 covers the end of the second trunk section 120, as shown most clearly in FIG. 6A. The lip 612 can define an aperture that is substantially equal in diameter to the inner diameter of the internal electrical connector 728.

Further, male sleeve 610 can include one or more electrical contacts configured to mate with the one or more electrical contacts 730a, 730b, 730c, 730d of the internal electrical connector 728. The one or more electrical contacts of male sleeve 610 can be female electrical contacts configured to receive one ore more male electrical contacts. Alternatively, the one or more electrical contacts of male sleeve 610 can be male electrical contacts configured to be received by one or more female electrical contacts. The one or more electrical contacts of male sleeve 610 can be in electrical communication with the one or more power system distribution connector(s) 616a, 616b. The one or more electrical contacts of male sleeve 610 can be located within one or more cavities located within the male sleeve 610. For example, the top surface of the male sleeve 610 can include one or more apertures and one or more electrical contacts can be disposed therein. In an example, a single aperture can include more than one electrical contact, such as two, three, four, or more electrical contacts. In such an example, the contacts can be oriented such that at least two contacts share a longitudinal axis. Alternatively, the one or more electrical contacts of male sleeve 610 can be located such that they protrude through the one or more cavities located within the male sleeve 610.

As depicted in FIG. 7A, trunk section 120 can include a female sleeve 720 and an internal electrical connector 728. As further depicted, female sleeve 720 can be disposed around an external portion of an end of the trunk section 120 and the internal electrical connector 728 can be disposed with an internal portion of the trunk section 120. FIG. 7B depicts a perspective looking into the trunk cavity of trunk section 120.

Internal electrical connector 728 can be retained by the second trunk section 120 by frictional forces between the inner wall of the second trunk section 120 and an outer wall of the internal electrical connector 728. Alternatively or in addition, the inner wall of the internal electrical connector 728 and the inner wall of the second trunk section 120 can be threaded such that the internal electrical connector 728 can be screwed into the second trunk section 120, or the internal electrical connector 728 can be attached to the second trunk section 120 by crimping, welding, or soldering or with an adhesive (e.g., glue, epoxy), a screw, a bolt, one or more rivets, a retaining clip, a detent and notch assembly (e.g., a protrusion extending from either the internal electrical connector 728 or the second trunk section 120 and the remaining object including a notch, a hole, a depression, a lip, or any other feature configured to retain the protrusion), or any other known attachment mechanisms or methods. Further, as depicted in FIGS. 7A and 8, various attachment mechanisms can be attached to the internal electrical connector 728 through holes in the second trunk section 120.

As previously discussed, the male sleeve 610 can be configured to mate with internal electrical connector 728 of the second trunk section 120 when the first trunk section 110 and the second trunk section. The internal electrical connector 728 can include one or more electrical contacts 730*a*, 730*b*, 730*c*, 730*d* configured to mate with the one or more electrical contacts of the male sleeve 610. The one or more electrical contacts 730*a*, 730*b*, 730*c*, 730*d* can be female electrical contacts configured to receive one more male electrical contacts. Alternatively, the one or more electrical contacts 730*a*, 730*b*, 730*c*, 730*d* can be male electrical contacts configured to be received by one or more female electrical contacts. The one or more electrical contacts 730*a*, 730*b*, 730*c*, 730*d* can be in electrical communication with the one or more power system distribution connector(s), such as those previously described with respect to the male sleeve 610. The one or more electrical contacts 730*a*, 730*b*, 730*c*, 730*d* can be located within one or more cavities located within the internal electrical connector 728. For example, a bottom surface of the internal electrical connector 728 can include one or more apertures and one or more electrical contacts can protrude therethrough. In an example, a single aperture can include more than one electrical contact, such as two, three, four, or more electrical contacts. In such an example, the contacts can be oriented such that at least two contacts share a longitudinal axis. Alternatively, the one or more electrical contacts 730*a*, 730*b*, 730*c*, 730*d* can be located such that they are disposed within the one or more cavities located within the internal electrical connector 728.

FIG. 8 depicts a first trunk portion 110 having a male sleeve 610 and a second trunk portion 120 having a female sleeve 720 and an internal electrical connector 728. As depicted, the male sleeve 610 can be configured to mate with internal electrical connector 728 of the second trunk section 120 and the female sleeve 720 can be configured to mate with the anti-rotation member 614 when the first trunk section 110 and the second trunk section 120 are mated such that the one or more electrical connectors of the male sleeve 610 are mated with the one or more electrical contacts 730*a*, 730*b*, 730*c*, 730*d* of the internal electrical connector 728, thus allowing power and data signals to be transmitted throughout the trunk sections.

Figure 9:
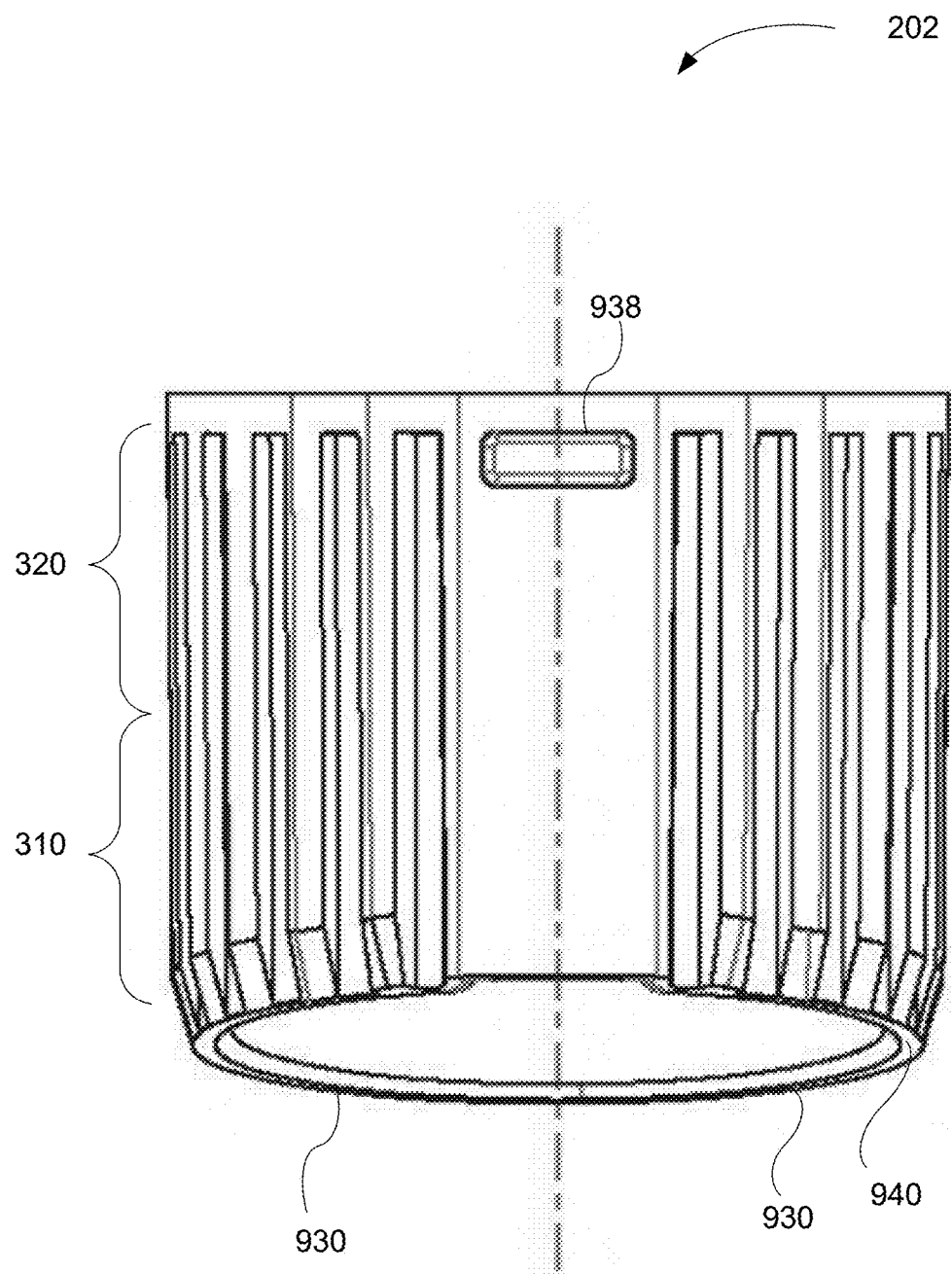
FIG. 9 is a side view of a sleeve with an angled portion, in accordance with the presently disclosed subject matter.
Figure 10:
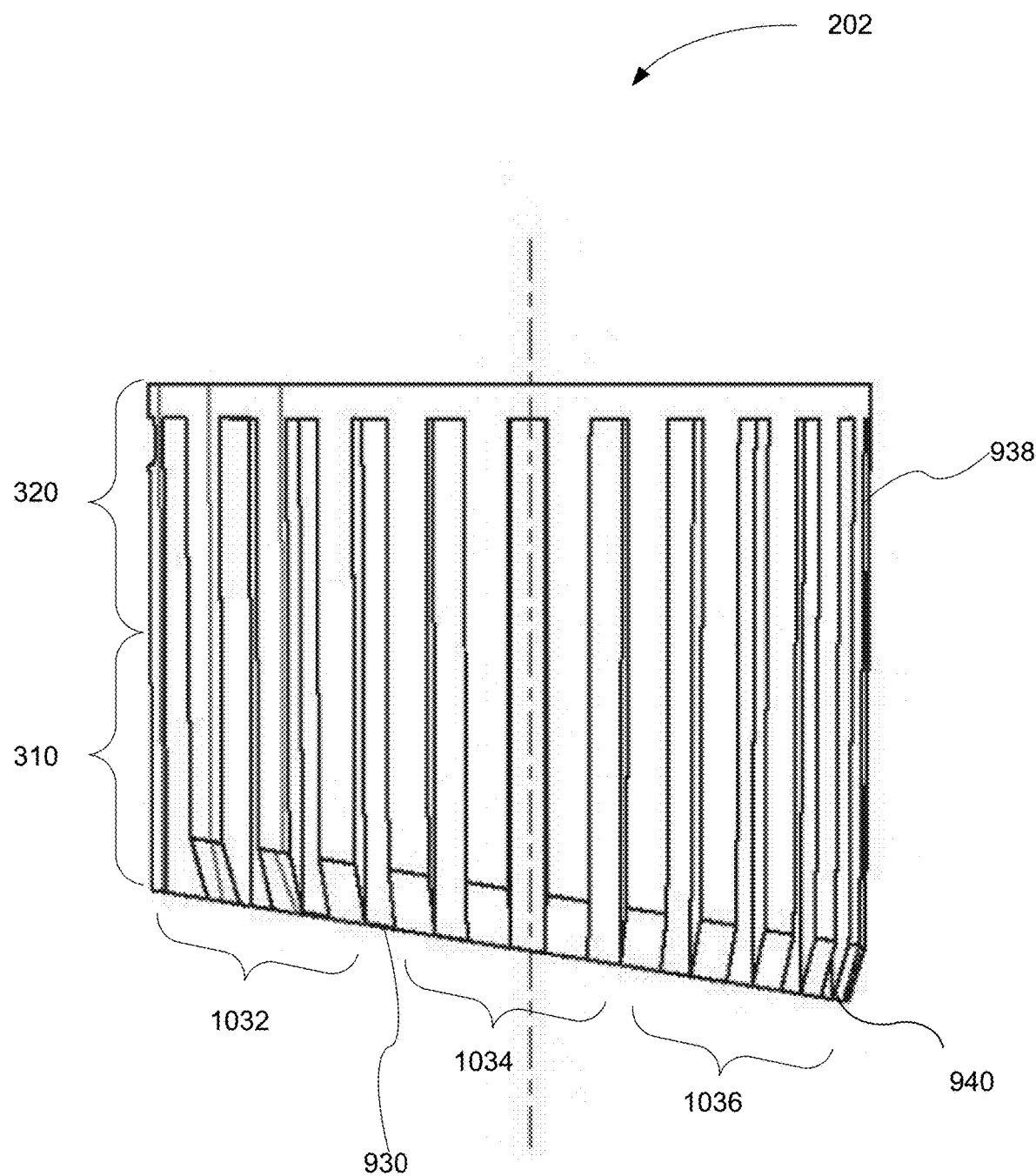
FIG. 10 is a side view of a sleeve with an angled portion, in accordance with the presently disclosed subject matter.
Figure 11:
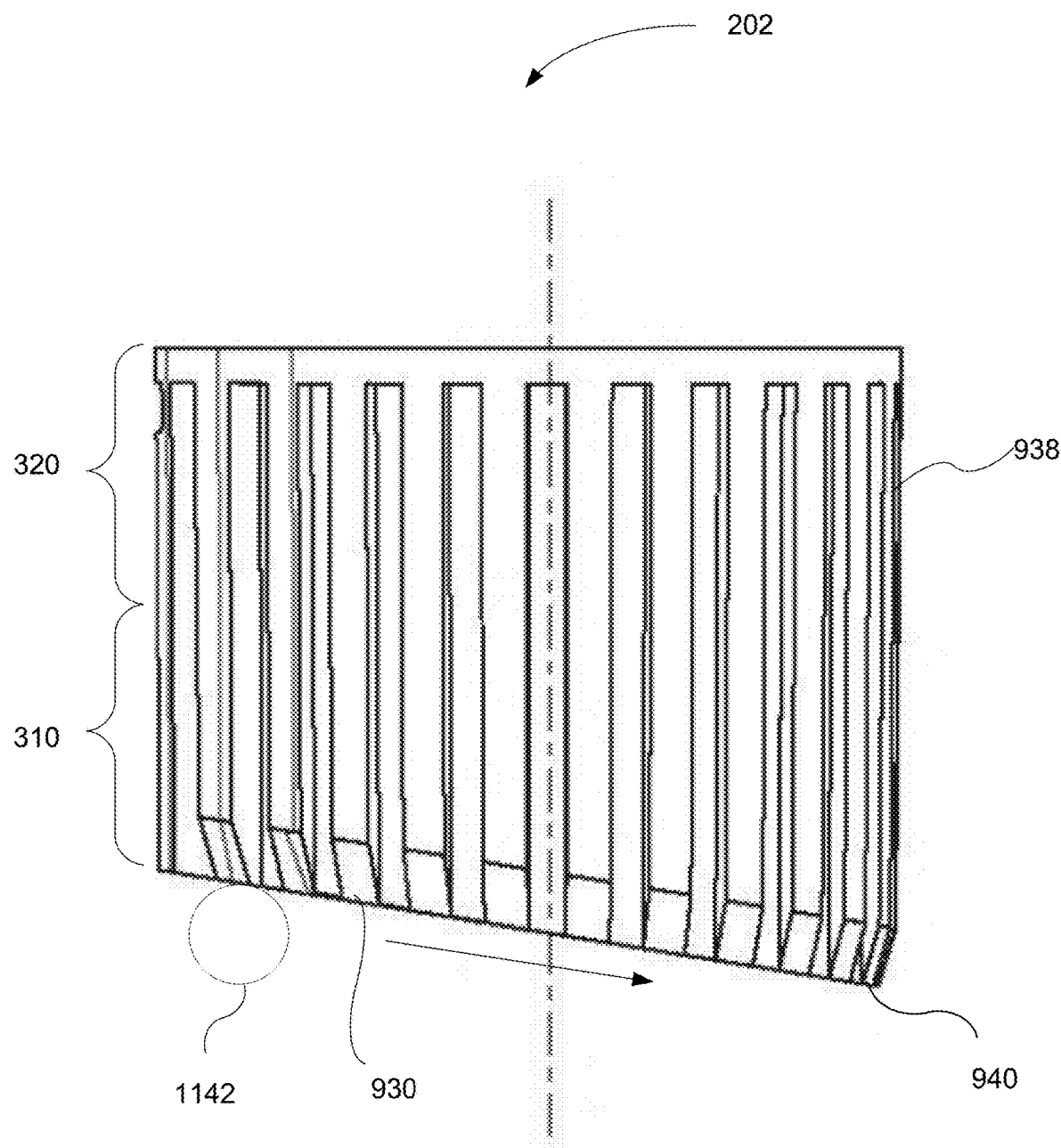
FIG. 11 is a side view of a system including a sleeve with an angled portion and a rolling protrusion, in accordance with the presently disclosed subject matter.

Referring to FIGS. 9-11, an alternative embodiment of a sleeve 202 that facilitates assembly of an artificial tree is illustrated. The sleeve 202 can have a first end 310 and a second end 320. In an example embodiment, the first end 310 of the sleeve 202 can have a lower lip 940, as illustrated in FIG. 9. The lower lip 940 can have a width approximately equal to the difference between the inner diameter of the first end 310 and the external diameter of the first end 310. The lower lip 940 can have an angled portion 930. The angled portion 930 of the lower lip 940 can slope downward at an angle of less than ninety degrees from a longitudinal axis. In one embodiment, the angled portion 930 can be at an angle of between approximately thirty degrees and fifty degrees from the longitudinal axis. As illustrated in FIG. 10, the angled portion 930 can include an upper portion 1032, a center portion 1034, and a lower portion 1036. The lower portion 1036 can be adjacent to an exterior protrusion 938 of the sleeve 202. The upper portion 1032 can be opposite of the exterior protrusion 938.

The first end 310 can have an inner diameter approximately equal to the external diameter of the first trunk section 110, allowing the first end 310 of the sleeve 202 to slide over the first trunk section 110 with minimal space existing between the inner diameter of the first end 310 and the external diameter of the first trunk section 110. The second end 320 of the sleeve 202 can have an inner diameter approximately equal to the external diameter of the second trunk section 120. When the inner diameters of the first end 310 and second end 320 substantially correspond to the external diameters of the first trunk section 110 and the second trunk section 120, respectively, the sleeve 202 can adequately interlock the first and second trunk sections 110, 120 to facilitate assembly of the tree.

In one embodiment, the sleeve 202 can include an exterior protrusion 938. The exterior protrusion 938 can be configured to receive an extending portion of a rolling protrusion 1142 during assembly of an artificial tree, and particularly when the second trunk section 120 is interlocked with the first trunk section 110. Further, the exterior protrusion 938 can vertically traverse the first end 310 and the second end 320 of the sleeve 202. The exterior protrusion 938 can be disposed approximate to the lower section 1032 of the angled portion 930.

The sleeve 202 can have a permanent attachment to the second trunk section 120. The permanent attachment can include a mechanical fastening member (e.g., a screw, a bolt). In one embodiment, the permanent attachment site can be proximate to the second end 320 of the sleeve 202. Alternatively or in addition to, a glue, epoxy, or other adhesive can be applied between the interior surface of the second end 920 and/or the exterior surface of the second trunk section 120.

A rolling protrusion 1142 can be disposed on the first trunk section 110. The rolling protrusion 1142 can extend through a wall of the first trunk section 110. The rolling protrusion 1142 can have an extending portion that protrudes from the exterior wall of the first trunk section 110. The extending portion can protrude at a ninety-degree angle such that the extending portion and the exterior wall of the first trunk section 110 are perpendicular. The extending portion of the rolling protrusion 1142 can include a head. The head can be a variety of shapes, including circular, rectangular, pentagonal, and hexagonal. In one embodiment, the head is substantially circular to facilitate rotation of the rolling protrusion 1142. The head can have a substantially smooth surface to facilitate rotation of the rolling protrusion 1142. In one embodiment, the extending portion of the rolling protrusion 1142 can further include a portion of a body fixed to the head. The portion of the body extending from the exterior surface of the first trunk section 110 can have a substantially cylindrical shape to facilitate rotation of the rolling protrusion 1142. The body can have a substantially smooth surface devoid of threading to facilitate rotation of the rolling protrusion 1142. In one embodiment, the rolling protrusion can be a screw or bolt.

The sleeve 202 having a lower lip 940 with the angled portion 930 and the rolling protrusion 1142 can be used in combination to facilitate assembly of an artificial tree. When the receiving portion 124 of the second trunk section 120 receives the extending portion 114 of the first trunk section 110, the rolling protrusion 1142 can interact with the angled portion 930 of the lower lip 940 at a plurality of points. In one embodiment, the body of the rolling protrusion 1142 can first interact with the lower lip 940 approximate to an upper portion 1032 of the angled portion 930. Alternatively, the extending portion of the rolling protrusion 1142 can first interact with the lower lip 940 approximate to a center portion 1034 or lower portion 1036 of the angled portion 930. As the second trunk section 120 is rotated clockwise to receive the extending portion 114 of the first trunk section 110 in the receiving portion 124 of the second trunk section 120, the force of weight from the second truck section 120 on the extending portion of the rolling protrusion 1142 can result in the rolling protrusion 1142 rotating clockwise. The angled portion 930 of the lower lip 940 of the sleeve in combination with the clockwise rotation of the rolling protrusion 1142 can guide the receiving portion 124 of the second truck section 120 to fully receive the extending portion 114 of the first trunk section 110. As the second truck section 120 is rotated to receive the extending portion 114 of the first trunk section 110, the extending portion of the rolling protrusion 1142 can continuously interact with the lower lip 940 along the angled portion 938 such that the extending portion of the rolling protrusion can interact with the upper portion 1032, the center portion 1034, and the lower portion 1036 of the angled portion 930. When the extending portion of the rolling protrusion 1142 reaches the exterior protrusion 938 adjacent to the lower portion 1036, the extending portion of the rolling protrusion 1142 can slide into an inner recess of the exterior protrusion 938. The extending portion of the rolling protrusion 1142 can be encased by the exterior protrusion 938. The exterior protrusion 938 can include internal ridges or threading that can limit the distance the extending portion of the rolling protrusion 1142 can slide into the inner recess of the exterior protrusion 938. When the extending portion of the rolling protrusion slides into the inner recess of the exterior protrusion 938 of the sleeve 202, the receiving portion 124 of the second trunk section and the extending portion 114 of the first trunk section 110 can be properly aligned together, and therefore, the first trunk section 110 and the second trunk section 120 can be adequately interlocked.

The combination of the sleeve 202 with the angled portion 930 on the first end 310 and the clockwise rotation of the rolling protrusion 1142 can facilitate assembly of an artificial tree. The angled portion 930 of the first end 310 of the sleeve 202 can disperse the force of weight of the second trunk section 120. Unlike a flat first end 310 of a sleeve 202 that directs the force of weight of a second trunk section 120 directly down, an angled first end 310 converts a portion of the force of weight from directly down to parallel with the angled portion 930. The decreased downward force of weight of the second trunk section 120 can also result in less friction between the rolling protrusion 1142 and the sleeve 202. This reduced friction can further facilitate rotation of the second trunk section 120 during tree assembly.

Figure 12:
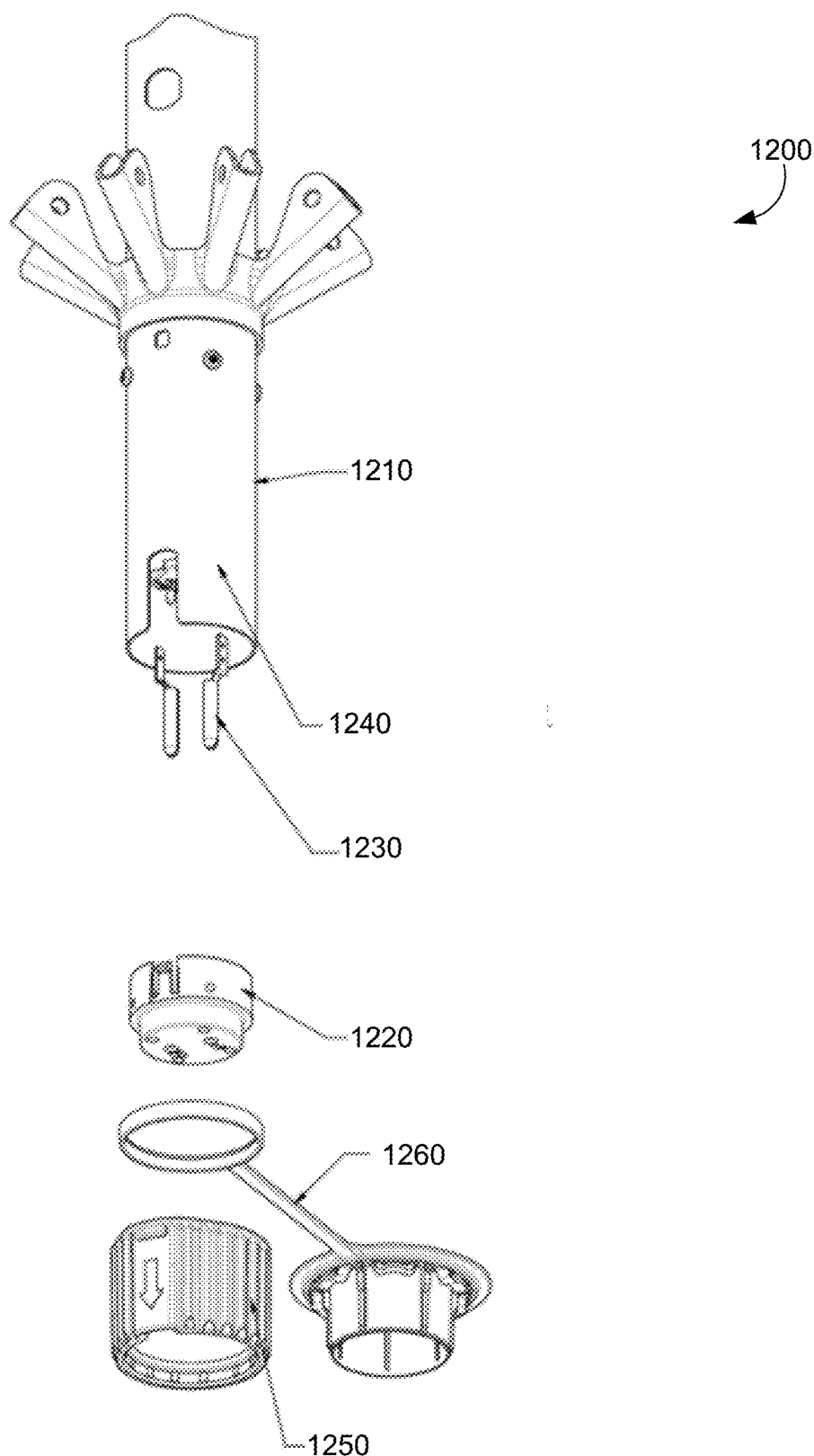
FIG. 12 is an exploded view of a tree portion having a sleeve system that is configured to transmit electrical power between trunk sections, in accordance with the presently disclosed subject matter.
Figure 13:
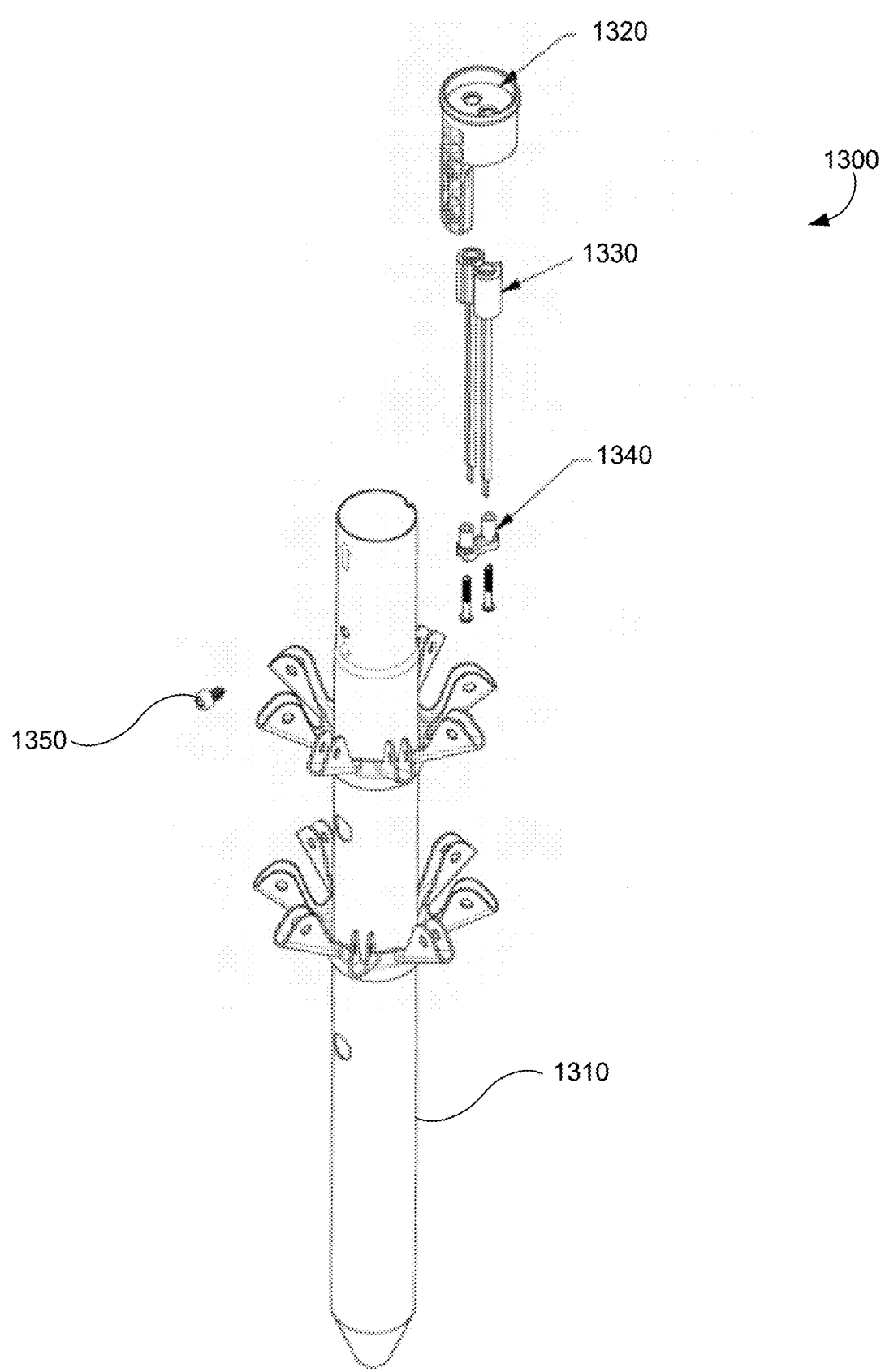
FIG. 13 is an exploded view of a tree portion having a sleeve system that is configured to transmit electrical power between trunk sections, in accordance with the presently disclosed subject matter.

FIGS. 12 and 13 depict a first trunk portion 1310 having a male sleeve 1320 and a second trunk portion 1210 having a female sleeve 1250 and an internal electrical connector 1220. As depicted, the male sleeve 1320 can be configured to mate with internal electrical connector 1220 of the second trunk section 1210 and the female sleeve 1250 can be configured to mate with the anti-rotation member 1350 when the first trunk section 1310 and the second trunk section 1210 are mated such that the one or more electrical connectors of the male sleeve 1320 are mated with the one or more electrical contacts 1230 of the internal electrical connector 1220, thus allowing power and data signals to be transmitted throughout the trunk sections.

FIG. 12 is an exploded view of a tree portion 1200 having a sleeve system and that is configured to transmit electrical power between trunk sections. As depicted, tree portion 1200 can include a trunk body, 1210, a female sleeve 1250, a protective cap 1260, an internal electrical connector 1220, one or more electrical contacts 1230, an internal power distribution system 1240.

Internal electrical connector 1220 can be retained by the second trunk section 1210 by frictional forces between the inner wall of the second trunk section 1210 and an outer wall of the internal electrical connector 1220. Alternately or in addition, the inner wall of the internal electrical connector 1220 and the inner wall of the second trunk section 1210 can be threaded such that the internal electrical connector 1220 can be screwed into the second trunk section 1210, or the internal electrical connector 1220 can be attached to the second trunk section 1210 by crimping, welding, or soldering or with an adhesive (e.g., glue, epoxy), a screw, a bolt, one or more rivets, a retaining clip, a detent and notch assembly (e.g., a protrusion extending from either the internal electrical connector 1220 or the second trunk section 1210 and the remaining object including a notch, a hole, a depression, a lip, or any other feature configured to retain the protrusion), or any other known attachment mechanisms or methods. Further, and as depicted, various attachment mechanisms can be attached to the internal electrical connector 1220 through holes in the second trunk section 1210.

As previously discussed, the male sleeve 1320 can be configured to mate with internal electrical connector 1220 of the second trunk section 1210 when the first trunk section 1310 and the second trunk section are mated. The internal electrical connector 1220 can include one or more electrical contacts 1230 configured to mate with the one or more electrical contacts of the male sleeve 1320. The one or more electrical contacts 1230 can be female electrical contacts configured to receive one more male electrical contacts. Alternatively, the one or more electrical contacts 1230 can be male electrical contacts configured to be received by one or more female electrical contacts. The one or more electrical contacts 1230 can be in electrical communication with the one or more power system distribution connector(s), such as those previously described with respect to the male sleeve 1320. The one or more electrical contacts 1230 can be located within one or more cavities located within the internal electrical connector 1220. For example, a bottom surface of the internal electrical connector 1220 can include one or more apertures and one or more electrical contacts can protrude therethrough. In an example, a single aperture can include more than one electrical contact, such as two, three, four, or more electrical contacts. In such an example, the contacts can be oriented such that at least two contacts share a longitudinal axis. Further, the contacts can be oriented such that at least two contacts are coaxial electrical contacts. Alternatively, the one or more electrical contacts 1230 can be located such that they are disposed within the one or more cavities located within the internal electrical connector 1220.

FIG. 13 is an exploded view of a tree portion 1300 having a sleeve system and that is configured to transmit electrical power between trunk sections. As depicted, tree portion 1300 can include a trunk body 1310, a male sleeve 1320 having one or more electrical contacts, an internal power distribution system 1330, sleeve cap 1340, and an anti-rotation mechanism 1350.

Male sleeve 1320 can be retained by the first trunk section 1310 by frictional forces between the inner wall of the first trunk section 1310 and an outer wall of the male sleeve 1320. Alternately or in addition, the inner wall of the male sleeve 1320 and the inner wall of the first trunk section 1310 can be threaded such that the male sleeve 1320 can be screwed into the first trunk section 1310, or the male sleeve 1320 can be attached to the first trunk section 1310 by crimping, welding, or soldering or with an adhesive (e.g., glue, epoxy), a screw, a bolt, one or more rivets, a retaining clip, a detent and notch assembly (e.g., a protrusion extending from either the male sleeve 1320 or the first trunk section 1310 and the remaining object including a notch, a hole, a depression, a lip, or any other feature configured to retain the protrusion), or any other known attachment mechanisms or methods. Further, as the anti-rotation member 1350 can be attached to the male sleeve 1320 through a hole in the trunk section 1310. As will be appreciated, such a connection provides additional mechanical support between the male sleeve 1320 and the trunk section 1310.

The male sleeve 1320 can include a top surface configured to abut a bottom surface of an internal electrical connector 1220 of the second trunk section 1210 when the first trunk section 1310 and the second trunk section 1210 are connected. The top surface can extend to, and be flush with, an end of the second trunk section 1210. Alternately, the top surface can extend beyond the end of the second trunk section 1210, or the end of the second trunk section 1210 can extend beyond the top surface. Further, and as previously described, male sleeve 1320 can include a lip such that the top surface extends beyond the end of the trunk section 1310 and the lip covers the end of the second trunk section 1310, as shown most clearly in FIG. 6A. The lip can define an aperture that is substantially equal in diameter to an inner diameter at least a portion of the internal electrical connector 1220.

Further, male sleeve 1320 can include internal power distribution system 1330 which can one or more electrical contacts configured to mate with the one or more electrical contacts 1230 of the internal electrical connector 1220. The one or more electrical contacts of male sleeve 1320 can be female electrical contacts configured to receive one more male electrical contacts. Alternatively, the one or more electrical contacts of male sleeve 1320 can be male electrical contacts configured to be received by one or more female electrical contacts. The one or more electrical contacts of male sleeve 1320 can be located within one or more cavities located within the male sleeve 1320. For example, the top surface of the male sleeve 1320 can include one or more apertures and one or more electrical contacts can be disposed therein. In an example, a single aperture can include more than one electrical contact, such as two, three, four, or more electrical contacts. In such an example, the contacts can be oriented such that at least two contacts share a longitudinal axis. Alternatively, the one or more electrical contacts of male sleeve 1320 can be located such that they protrude through the one or more cavities located within the male sleeve 1320. Further, the male sleeve may include a sleeve cap 1340 configured to hold at least a portion of the internal power distribution system 1330 within the one or more cavities of the male sleeve 1320. As will be appreciated such design provides additional stability for the electrical components within the trunk portions.

While the present disclosure has been described in connection with a plurality of exemplary aspects, as illustrated in the various figures and discussed above, it is understood that other similar aspects can be used, or modifications and additions can be made to the described aspects for performing the same function of the present disclosure without deviating therefrom. Therefore, the present disclosure should not be limited to any single aspect, but rather construed in breadth and scope in accordance with the appended claims.

What is claimed is:

1. A kit for constructing an artificial tree trunk, the kit comprising:
   a first trunk section including:
      a body having a first external diameter; and
      a first end having a second external diameter smaller than the first external diameter;
   a second trunk section including a second end having:
      an external diameter; and
      an internal diameter larger than the second external diameter of the first end; and
   a generally hollow unitary sleeve including:
      a plurality of ribs disposed on an internal surface of the generally hollow sleeve;
      a first sleeve end having a first internal diameter approximately equal to the first external diameter of the first trunk section; and
      a second sleeve end having a second internal diameter approximately equal to the external diameter of the second trunk section;
   wherein the generally hollow unitary sleeve comprises a first plurality of ribs disposed on an internal surface of the first sleeve end and a second plurality of ribs disposed on an internal surface of the second sleeve end; and
   wherein one of the first and second pluralities of ribs comprises axially extending ribs and the other of the first and second pluralities of ribs comprises annular ribs.

2. The kit of claim 1, wherein the first sleeve end is configured to receive at least a portion of the first end of the first trunk section and the second sleeve end is configured to receive at least a portion of the second end of the second trunk section.

3. The kit of claim 1, wherein the generally hollow unitary sleeve further includes an internal protrusion disposed between the first and second sleeve ends, the internal protrusion defining a third internal diameter that is less than both the first and second internal diameters.

4. The kit of claim 3, wherein the internal protrusion gradually and continuously transitions from the first internal diameter to the third internal diameter.

5. The kit of claim 3, wherein the third internal diameter is approximately equal to the second external diameter of the first end of the first trunk section.

6. The kit of claim 3, wherein the first sleeve end is configured to receive at least a portion of the first trunk section.

7. The kit of claim 1, wherein the one of the first and second pluralities of ribs consists of axially extending ribs and the other of the first and second pluralities of ribs consists of annular ribs.

* * * * *